United States Patent [19]

Blake

[11] Patent Number: 5,272,618
[45] Date of Patent: Dec. 21, 1993

[54] FILAMENT CURRENT REGULATOR FOR AN X-RAY SYSTEM

[75] Inventor: James A. Blake, Franklin, Wis.

[73] Assignee: General Electric Company, Milwaukee, Wis.

[21] Appl. No.: 919,347

[22] Filed: Jul. 23, 1992

[51] Int. Cl.⁵ .................. H02P 13/00; H05G 1/34
[52] U.S. Cl. ........................... 363/79; 363/25; 378/110
[58] Field of Search ............ 363/25, 24, 28, 79, 363/97, 98; 323/311, 312, 299, 303; 378/101, 109, 110, 114

[56] References Cited

U.S. PATENT DOCUMENTS

| | | | |
|---|---|---|---|
| 3,567,995 | 3/1971 | Lauritzen | 315/311 |
| 4,253,048 | 2/1981 | Osako | 315/307 |
| 4,272,816 | 6/1981 | Matsumoto | 364/483 |
| 4,504,895 | 3/1985 | Steigerwald | 363/17 |
| 4,573,184 | 2/1986 | Tanaka et al. | 378/110 |
| 4,766,287 | 8/1988 | Morrisroe et al. | 356/316 |
| 4,775,992 | 10/1988 | Resnick et al. | 378/110 |
| 4,797,908 | 1/1989 | Tanaka et al. | 378/105 |
| 4,809,310 | 2/1989 | Salesses et al. | 378/109 |
| 4,930,145 | 5/1990 | Sherwin et al. | 378/109 |
| 4,930,146 | 3/1990 | Flakas et al. | 378/110 |

FOREIGN PATENT DOCUMENTS

58-61599 4/1983 Japan.

*Primary Examiner*—Steven L. Stephan
*Assistant Examiner*—Adolf Berhane
*Attorney, Agent, or Firm*—Quarles & Brady

[57] ABSTRACT

A current supply has a first voltage summing circuit with two inputs, one of which receives a signal that indicates a desired current level to be produced. A current source produces a current level at an output in response to a control signal received from the first voltage summing circuit. The current source output is coupled to a center tap of the primary winding of a transformer that has a capacitor connected across the end terminals of its primary winding. Separate transistors connect ends of the primary winding to a common node and a resistor couples the node to circuit ground. A sensor produces a voltage $e_i$ that is proportional to a magnitude of the current flowing through said capacitor. A second voltage summing circuit produces an output voltage $e_f$ equivalent to the sum of voltage $e_i$ and the voltage across the resistor and the output voltage $e_f$ is applied to the other input of said first voltage summing circuit. Thus any change of the current from the source or of the current flowing through the capacitor alters the current flow in the primary winding in a manner that maintains the current in the secondary winding at a constant level.

6 Claims, 1 Drawing Sheet

FILAMENT CURRENT
SUPPLY 18

FILAMENT CURRENT REGULATOR FOR AN X-RAY SYSTEM

BACKGROUND OF THE INVENTION

The present invention relates to X-ray diagnostic imaging systems and more particularly to devices which regulate the current flowing through the filament of the X-ray tube in such systems.

A conventional X-ray system has a vacuum tube which when electrically excited emits X-rays. The tube includes a filament to heat a cathode in the tube to an operating temperature. Once at this temperature, a high DC voltage is applied across the cathode and an anode resulting in an electron beam bombarding the anode to produce X-ray emission. The X-ray tube can be electrically modeled as a variable resistor, the resistance of which being a function of the temperature of the tube's filament, and therefore the filament current. Within the filament's operating temperature range, the emission current flowing between the anode and the cathode, and hence the X-ray emission, is proportional to the filament current.

Because of the hazards associated with overexposure to X-rays, as well as the need to control the exposure for accurate imaging, it is necessary to closely regulate the X-ray emission. One previous method of accomplishing this regulation, disclosed in U.S. Pat. No. 4,930,145, continuously compared the actual anode-to-cathode voltage to a reference level and varied a filament current power supply, based on the result of the comparison, until the desired anode-to-cathode voltage was achieved. The filament current also was sensed to produce a feedback signal which controlled the filament current power supply.

Typically a regulated DC source was used as the filament current power supply since it is easier to regulate to a constant level than the RMS output of an AC supply. The DC output from the source was coupled to a chopper circuit whose load was the primary winding of a transformer with the tube filament connected to the transformer secondary winding. Low losses where achieved by switching the power supply with fast rise and fall times to minimize the heat dissipated in the switching device. In view of the rapid switching of current to the transformer, a resonating capacitor was connected across the primary winding.

As the filament age, its electrical resistance tends to increased and this change was coupled through the transformer into the power supply. The change in resistance altered the Q of the resonant transformer circuit and thus the magnitude of the resonant circulating current. Because the resonant circulating current was inductively coupled into the secondary winding and the filament, such variation of the resonant circulating current changed the total current through the filament in an unregulated manner.

SUMMARY OF THE INVENTION

An X-ray diagnostic imaging apparatus includes a vacuum tube which is capable of emitting X-rays upon excitation. The tube has an anode, a cathode and a filament. A source of a high voltage is provided to bias the anode and cathode and a supply furnishes current to the filament.

A current supply comprises a combining circuit which sums signals applied to two inputs into a control signal at an output. One of the combining circuit inputs receives an externally produced signal that indicates a desired magnitude of current to be produced by said supply. The control signal is applied to a current source which produces a current level $i_k$ at an output in response to a voltage level of the control signal.

A transformer has primary winding with a center tap to which the output of the current source is connected, and has secondary winding connected to the filament. A means is coupled to the transformer to switch the current flow alternately between the center tap and one of the end terminals, and between the center tap and the other end terminal. A resonating capacitor is connected across end terminals of the primary winding to form a resonant circuit.

A first means senses the current level produced by said current source and produces a voltage level $e_s$ indicative of that current level. A second means senses a magnitude of circulating current flowing through the resonating capacitor and produces a voltage level $e_i$ indicative of that magnitude. A summing circuit combines the two voltage levels $e_s$ and $e_i$ to produce a feedback signal that is applied to the other input of said combining circuit.

The general object of the present invention is to provide regulation of the filament current applied to the X-ray tube.

Another object is to accomplish the regulation in a manner that compensates for variation in the current flowing through the resonating capacitor, which variation occurs as a result of changes in the filament resistance.

DETAILED DESCRIPTION OF THE INVENTION

Figure 1:
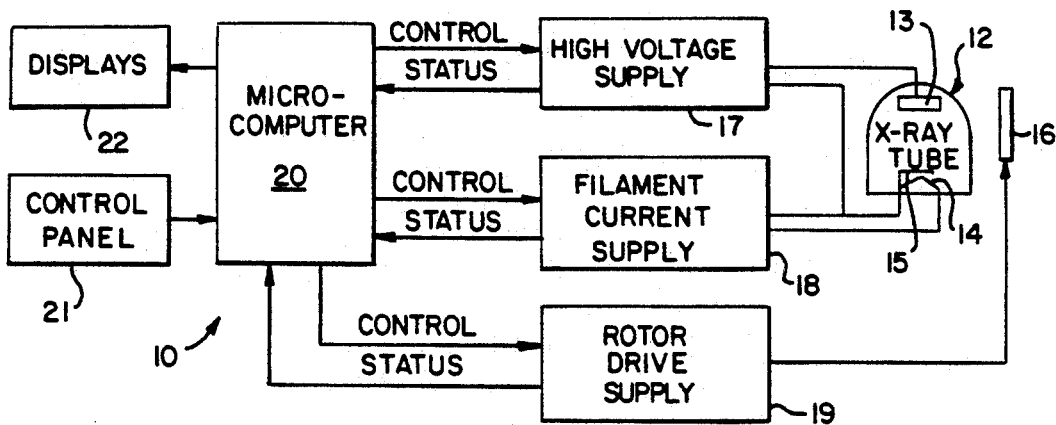
FIG. 1 is a block diagram of an X-ray imaging system into which the present invention is incorporated.

FIG. 1 shows the control circuitry for a typical X-ray generator 10 which produces an X-ray beam for diagnostic imaging purposes. The generator includes a conventional X-ray vacuum tube 12 having a rotating anode 13. Associated with the tube is a stator coil 16 which produces an electromagnetic field within the tube 12 causing the anode 13 to rotate. The X-ray tube 12 also includes a cathode 15 electrically coupled to a filament 14.

The X-ray generator 10 has a high voltage supply 17 which produces a DC excitation voltage that is applied between the anode 13 and the cathode 15. A filament current supply 18 produces a current which heats the filament 14 to an operating temperature that corresponds to the intensity level selected for the X-ray exposure. A rotor drive supply 19 produces an electrical current for the stator 16 which generates the electromagnetic field to rotate the tube anode 13. In addition to being coupled to a source of electricity (not shown), each of the electrical supplies 17, 18, and 19 is connected to a microcomputer 20. The supplies 17-19 receive control signals from the microcomputer to govern their operation, and transmit signals indicating their status to the microcomputer 20.

A control panel 21 provides a means by which an operator enters values for parameters of an X-ray exposure which the microcomputer uses to control the power supplies 17-19. For example, the operator defines an exposure by selecting one of several predefined anode-to-cathode voltage potentials at which to excite the X-ray tube, and selects the emission current-time product for the exposure. Based on this selection, other parameters for the exposure, such as the magnitude of the emission current and filament current are set automatically by the microcomputer 20. A display panel 22 is coupled to the microcomputer 20 to provide a visual indication of the generator's status to the operator.

The block diagram illustrated in FIG. 1 represents a generic X-ray generator 10, and it should be understood that the present circuit for regulating the filament current has application to many types of X-ray systems, and other vacuum tube diode applications.

Figure 2:
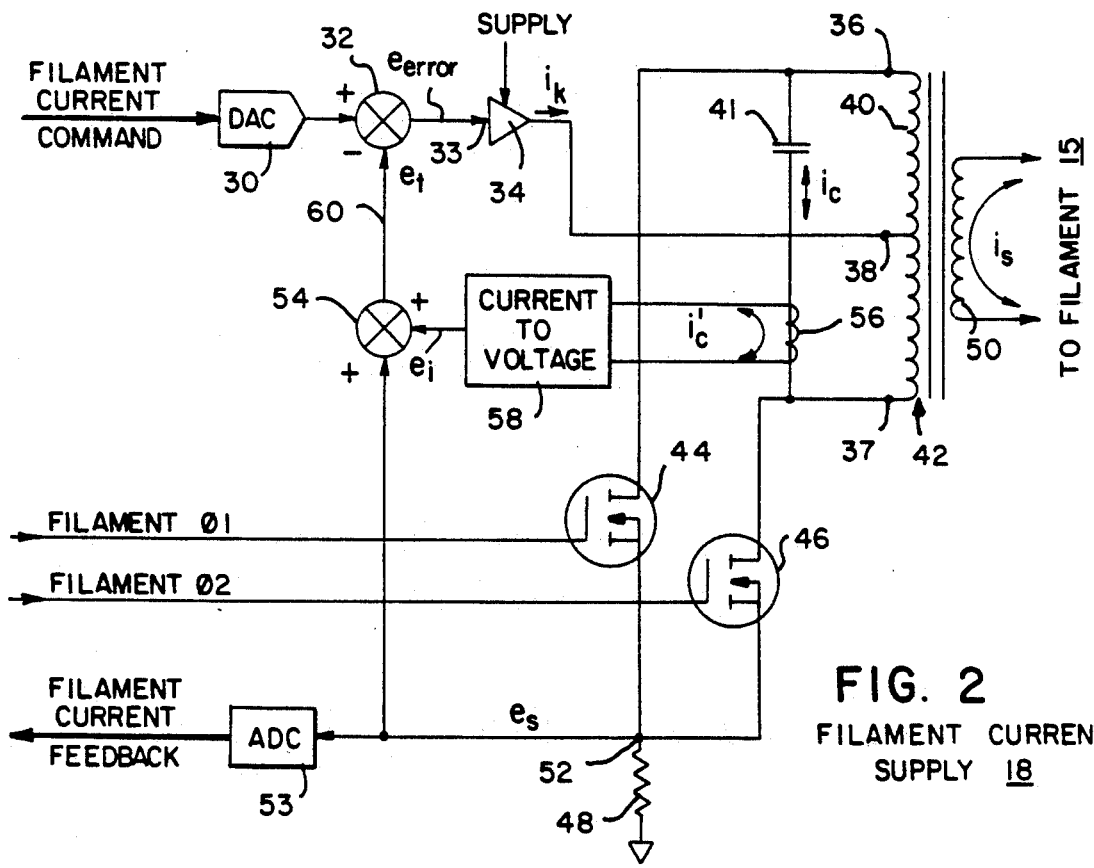
FIG. 2 is a detailed schematic diagram of a filament current supply according to the present invention.

FIG. 2 illustrates the details of the filament current supply 18 which utilizes a novel constant current regulator. A digital FILAMENT CURRENT COMMAND signal from the microcomputer 20, which designates the filament current level for the exposure, is applied to a digital to analog converter (DAC) 30 to produce an analog voltage level that corresponds to the digital command. The output of the DAC 30 is coupled to a non-inverting input of a first summing circuit 32 which produces a voltage level, designated $e_{error}$ at an output. The output of the first summing circuit 32 is connected to a control input 33 of a current source 34. The voltage level, designated $e_{error}$, applied to this control input 33 determines the magnitude of the current $i_k$ at the output of the current source 34. The output from the current source 34 is connected to the center tap 38 for a primary winding 40 of a filament transformer 42.

The end terminals 36 and 37 of the primary winding 40 also are coupled to system ground by separate switching transistors 44 and 46 and a common current sensing resistor 48. The gate electrodes of the switching transistors 44 and 46 are connected to control lines from the microcomputer 20 and each gate electrode receives one of two opposite phase, complementary, 2 KHz control signals, designated FILAMENT $\phi 1$ and FILAMENT $\phi 2$. These control signals alternately render the switching transistors 44 and 46 conductive thus sending the DC current from source 34 through different halves of the transformer primary winding 40 to induce an alternating current $i_s$ in the transformer secondary winding 50. The filament 14 of X-ray tube 12 is coupled to the secondary winding 50 of the transformer 42. A capacitor 41 is connected across the ends terminals 36 and 37 of the transformer primary winding 40 to provide a resonant circuit which determines the frequency content of the secondary current $i_s$.

The voltage $e_s$ across current sensing resistor 48 is proportional to the current $i_k$ produced by source 34. A node 52 between the transistors 44 and 46 and resistor 48 is connected to the input of an analog to digital converter (ADC) 53 which sends a FILAMENT CURRENT FEEDBACK signal to an input of the microcomputer 20. The voltage $e_s$ at node 52 also is applied to an input of a second summing circuit 54.

The present regulator 18 further includes another current sensor, such as a sensing transformer 56 to detect the resonant current $i_c$ flowing through the capacitor 41 across the primary winding 40. Current sensing transformer 56 is connected to a current-to-voltage converter 58 which produces an output voltage $e_i$ that is proportional to the magnitude of current $i_c$. The output voltage $e_i$ from converter 58 is coupled to another input of the second summing circuit 54 where it is summed with voltage $e_s$. The result of the summation is a feedback voltage $e_t$ on output line 60 which is corresponds to the total current $(i_k+i_c)$ in the primary winding 40 of the filament transformer 42. This feedback voltage $e_t$ is coupled to an inverting input of the first summing circuit 35 which combines the feedback voltage with the voltage produced by the DAC 30 to produce the input signal $e_{error}$ for the current source 34.

With continuing reference to FIG. 2, when an X-ray is to be taken, the operator enters values for the exposure parameters into the control panel 21. From these values the microcomputer 20 determines a filament current level for the exposure and issues a FILAMENT CURRENT COMMAND signal to the filament current supply 18. The voltage produced by the DAC 30 in response to this command signal indicates the magnitude of the filament current desired for the exposure. The output voltage from the DAC is combined with the feedback voltage $e_t$ to produce the input signal $e_{error}$ for controlling the output of the current source 34. Current $i_k$ from the source 34 is fed through the primary winding 40 of the filament transformer 42 as the transistors 44 and 46 are pulsed into conductive states. The current $i_k$ alternately flows through each half of the primary winding 40 and combines with the resonant current $i_c$ to induce a current $i_s$ in the transformer secondary winding 50. Thus the current $i_s$ flowing through the filament 14 is a function of the sum of the source current $i_k$ and the resonant current $i_c$ that flow through the filament transformer primary 40.

As the resistance of the filament 14 changes with age, the change in loading is coupled back to the filament transformer primary winding, affecting $i_c$ and altering the relationship between $i_k$ and $i_s$. The variation of current $i_c$ produces a corresponding change in the level of the current $i_c'$ from the sensing transformer 56 which in turn alters voltage $e_i$ from the current to voltage converter 58. The new level of voltage $e_i$ is applied to the second summing circuit 54 and changes the feedback voltage $e_t$, that is coupled to an input of the first second summing circuit 32. The change in feedback voltage $e_t$ alters the level of the $e_{error}$ signal which changes the magnitude of current $i_k$ to keep the filament current $i_s$ constant. In this manner, the regulation of the filament current supply 18 compensates for changes in the resistance of the filament 14.

Similarly, deviation in the supply current $i_k$ produces a change in the feedback voltage $e_t$ which causes an alteration in the control signal $e_{error}$ at the input of the current source to compensate for the variation.

Thus if the actual filament current $i_s$ deviates from the level selected for the X-ray exposure, the $e_{error}$ signal adjusts the magnitude of supply current $i_k$ to produce the desired filament current level.

The invention being claimed is:

1. A current supply for a filament of a vacuum tube comprising:

a combining circuit having two inputs and an output wherein signals applied to the two inputs are combined to produce a control signal at the output, one of the inputs for receiving a signal that indicates a desired magnitude of current to be produced by said current supply;

a current source having a control input connected to the output of said combining circuit and having an output terminal at which said current source produces a level of current that varies in response to a signal at the control input;

a transformer having primary and secondary windings;

a capacitor connected across the primary winding of said transformer;

a means, coupled to said transformer, for switching current from said current source alternately through different sections of the primary winding;

a first means for sensing the current level produced by said current source;

a second means for sensing a magnitude of current flowing through said capacitor; and means for producing a feedback signal indicative of a magnitude of current flowing through the secondary winding, which feedback signal is produced in response to said first and second means for sensing and is applied to the other input of said combining circuit.

2. A current supply for a filament of a vacuum tube comprising:

a first voltage summing circuit having two inputs and a first summation output, one of the inputs receiving a signal that indicates a desired magnitude of filament current;

a current source having a control input connected to the first summation output of said first voltage summing circuit and having an output terminal at which said current source produces a level of current that varies in response to a signal at the control input;

a transformer having primary and secondary windings;

a capacitor connected across the primary winding of said transformer;

a pair of switches, each switch connected in series with the output of the current source and a different section of the primary winding of said transformer;

a first current sensor which produces a voltage $e_s$ that is proportional to the current level produced by said current source;

a second current sensor which produces a voltage $e_i$ that is proportional to a magnitude of current flowing through said capacitor; and a second voltage summing circuit connected to said first and second current sensors to sum voltages $e_s$ and $e_i$ at a second summation output which is connected to the other input of said first voltage summing circuit.

3. The current supply as recited in claim 2 wherein said pair of switches comprises a first transistor having a conductive path connected in series with one section of the primary winding and a second transistor having a conductive path connected in series with another section of the primary winding.

4. The current supply as recited in claim 3 further comprising a microcomputer which produces a pair of complementary control signals, each of which is coupled to one of said transistors to alternately place the transistor in conductive and non-conductive states.

5. A current supply comprising:

means for receiving a signal indicating a desired magnitude of current;

a first voltage summing circuit having two inputs one of which is connected to said means for receiving, and having a first summation output;

a current source having control input connected to the first summation output of said first voltage summing circuit and having an output terminal, said current source produces a level of current at the output terminal in response to a signal at the control input;

a transformer having primary winding with a center tap and two end terminals, and having secondary winding;

a capacitor connected across the end terminals of the primary winding;

a node;

a first transistor having a conductive path connected between one of the end terminals and said node;

a second transistor having a conductive path connected between the other of the end terminals and said node;

a resistor connecting said node to a reference voltage level;

a current sensing transformer coupled to sense current $i_c$ flowing through said capacitor;

a current to voltage converter connected to said current sensing transformer and producing a voltage $e_i$ that is indicative of a magnitude of the current $i_c$; and a second voltage summing circuit connected to said node and to said current to voltage converter and producing an output voltage $e_t$ which corresponds to the sum of voltages $e_s$ and $e_i$, the output voltage $e_t$ being coupled to the other input of said first voltage summing circuit.

6. The current supply as recited in claim 5 further comprising a microcomputer which produces a first control signal coupled to drive said first transistor into alternate conductive and non-conductive states, and a second control signal coupled to drive said second transistor into alternate conductive and non-conductive states, the second control signal being the complement of the first control signal.

* * * * *